May 19, 1936.  C. L. EKSERGIAN  2,041,326
ARTILLERY WHEEL
Filed May 7, 1934
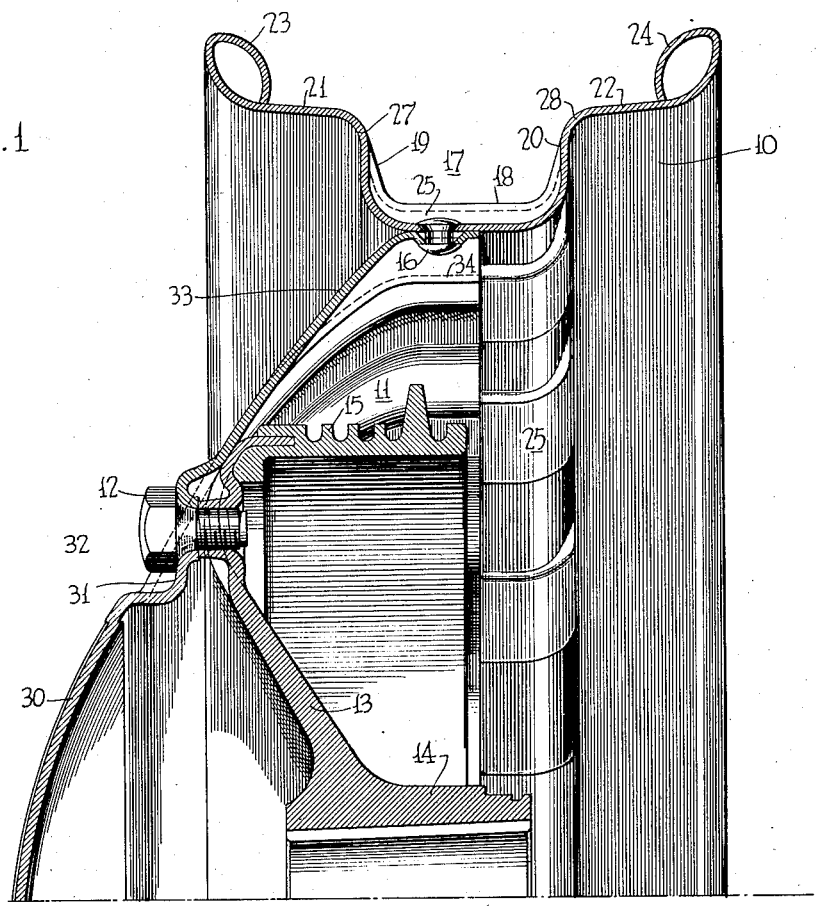
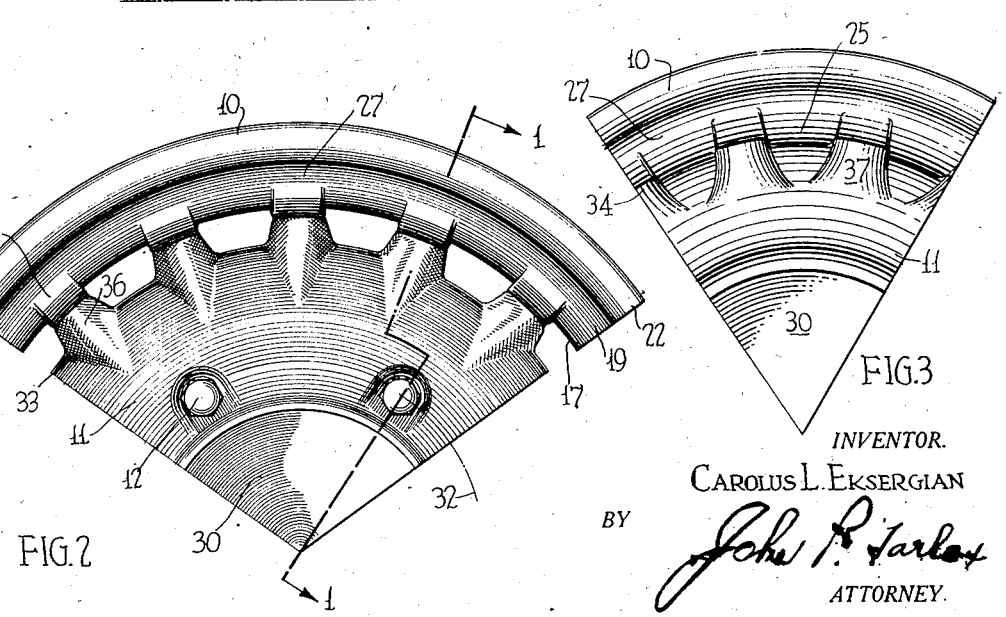
INVENTOR.
CAROLUS L. EKSERGIAN
BY
ATTORNEY.

Patented May 19, 1936

2,041,326

UNITED STATES PATENT OFFICE 2,041,326

ARTILLERY WHEEL

Carolus L. Eksergian, Detroit, Mich., assignor to Budd Wheel Company, Philadelphia, Pa., a corporation of Pennsylvania Application May 7, 1934, Serial No. 724,235

5 Claims. (Cl. 301—64)

This invention relates to vehicle wheels and more particularly to wheel body and rim combinations for high speed modern vehicles.

Among the objects of this invention may be enumerated the construction of a vehicle wheel with a small number of elemental parts, the provision of a wheel body of pleasing appearance, the fabrication of a wheel body of great strength with low weight, the application of a light weight rim with its consequent reduction in centrifugal forces, and a wheel body complemental therewith, and a wheel having a reduced polar moment of inertia.

I attain, among others, the enumerated desired objects of this invention by the fabrication of a wheel preferably of two parts, the one a very low weight rim member, the other a wheel body. Furthermore, the rim member having transversely extending portions has a complemental wheel body portion substantially coextensive therewith.

The invention will be better understood from the accompanying drawing when considered in connection with the appended specification and claims.

Figure 1 represents an axial section of a wheel made according to this invention.

Figure 2 is a partial elevation showing a segment of the upper half of a wheel.

Figure 3 is a partial view of a variation.

In modern wheel design wherein trends are toward wide rim constructions and relatively small overall rim diameters, although weight may be reduced by the decrease in annular extent because of reduced diameter, the increased axial or transverse extent of the rims as a rule increases the weight so that the net result, instead of being a reduction in weight, is an increase in weight. This increases centrifugal forces and other problems in vehicle design. The rim flanges must have sufficient strength to support the vehicle load under conditions of tire deflation and to maintain the flange portion in its original section. Furthermore, the rim flange must have sufficient strength to support the load per wheel while at the same time distributing the load from a point of maximum vertical application substantially uniformly into the vertically extending portions of the rim at the opposite horizontal axial extremities of wheel radii. If very light gauge material is used for the rim, difficulties are encountered due to the lack of rigidity and the resulting lateral spread from tire pressure. With different types of tires the drop center well must be of considerable depth and the depth of the well influences the stiffness of the bead and vice versa. Where a very light gauge material is utilized, the rim flanges may be of substantially hollow tubular section providing great strength in this zone of the rim partially avoiding the loss of rigidity from small gauge material and transverse ribbing may be utilized to further stiffen the wheel against distortion. This ribbing to approach maximum rigidity should have its undulations or corrugations tied together by tie means of suitable form. In the embodiments of this invention illustrated, the ribs 25 of the rim member are tied together by the wheel body through the spoke like portions 36 in the one form and in the further form these corrugations are complementally tied together by similar such portions of the wheel body.

Considering the various figures of the drawing in more detail, one form of wheel constructed according to my invention comprises a rim member 10 and a wheel body 11 secured by cap nuts 12 to hub flange 13 of the hub member 14 which has integral therewith a brake drum 15.

The wheel body 11 and the rim 10 are secured together in suitable manner as shown by rivets 16 or welds either spot or spud or by any other suitable connections.

The form of rim member 10 comprises a drop center portion 17 having a base 18 and side walls 19 and 20, respectively, extending radially outwardly and terminating in substantially axially extending tire seat portions 21, 22, which seat portions terminate in flange portions 23 and 24, which are preferably of substantially tubular section and preferably annularly continuous. Loads on the wheel may be distributed by means of these portions which provide with very light weight structures a large attainable strength. To provide additional strength and dissemination of loads the rim member has a plurality of annularly spaced transversely extending ribs or channels 25. These channels are substantially uniform in transverse section across the drop base portion 18 and are tapering with reduced transverse section as they emerge from the drop base portion into the side wall portions 19 and 20. The transverse section is reduced until at the points 27 and 28 the axially extending ribs disappear in the single thickness of the rim member radially inwardly of the tire seats.

The wheel body 11 comprises in the form shown, a single sheet metal member having a hub cap simulating portion 30 and a plurality of countersunk annularly spaced bolt hole openings 31 for the reception of the cap nuts 12. Outwardly of the bolt hole circle 32, the wheel body becomes gradually sinuous radially in the zone 33 and then turns substantially axially into a definitely corrugated peripheral portion 34. This portion 34 may be complemental with the drop base portion of the rim member so that the complemental corrugations of the rim and wheel body provide an artillery wheel body with outward spoked appearance 36, although by way of variation the undulations of the wheel body may be complemental with the troughs of the rim in which case a disc type wheel of spoke simulating appearance 37 can result.

It is apparent that wheel bodies of varied appearance may be constructed in this manner, although the preferred form comprises an artillery wheel. Modifications within the true spirit and scope of this invention are intended to be covered by the appended claims forming a part hereof.

What I claim is:

1. A metal vehicle wheel comprising a substantially conical wheel body having a corrugated radially outer periphery and a drop center rim member having a corrugated drop center portion, said rim and body members having securing means extending through the radially inwardly projecting crests of the rim corrugations and the radially outwardly extending crests of the wheel body corrugations.

2. A pressed metal vehicle wheel comprising a substantially radially extending wheel body member having a substantially corrugated peripheral portion and a sheet metal drop center type rim member having a substantially corrugated drop base portion, the crests of the corrugations in the rim projecting radially inwardly and the crests of the corrugations in the wheel body member projecting radially outwardly, the first mentioned crests resting on the last mentioned crests and complementally forming spokes, and means securing the crests together.

3. A pressed metal vehicle wheel comprising a substantially conical wheel body having a corrugated nave periphery and a drop center rim member having a corrugated drop base portion, the corrugations of said wheel nave and rim base portion respectively providing complemental radially outwardly projecting ribs and radially inwardly projecting ribs which define composite wheel spokes, and means associated with said ribs securing the rim to the wheel body.

4. A sheet metal vehicle wheel comprising a substantially conical wheel body having projections formed on its periphery and a drop center rim member having a drop base portion corrugated to form radially inwardly projecting ribs, said projections and ribs complementing each other to form composite spokes, and means extending through the projections and ribs and securing the rim to the wheel body.

5. A pressed metal artillery type wheel assembly for vehicles comprising a wheel body which at its periphery has the metal thereof formed with circumferentially spaced radial depressions and spoke projections and a sheet metal rim of the drop center type having its base portion formed with circumferentially spaced radially inwardly projecting strengthening ribs formed by corrugating the said base portion, said spoke projections and ribs mating when the rim is assembled on the wheel body and forming composite spokes for the wheel, and means securing the rim to the wheel body.

CAROLUS L. EKSERGIAN.